United States Patent Office 3,420,263
Patented Jan. 7, 1969

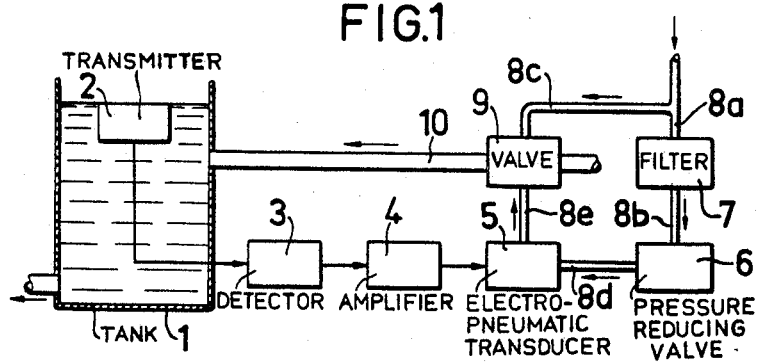
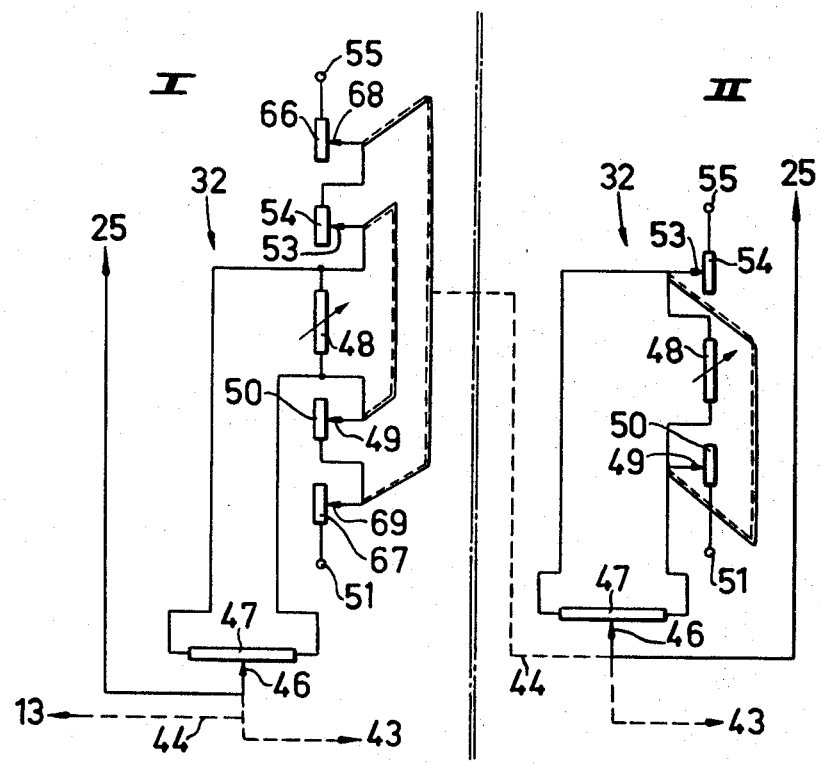

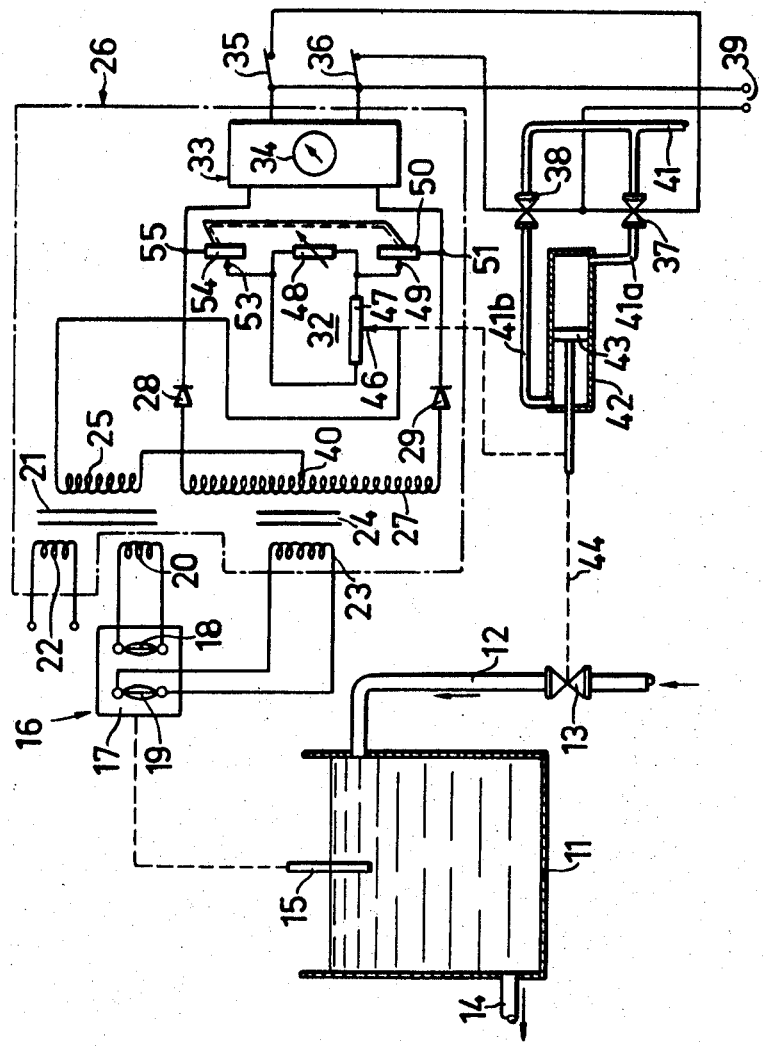

3,420,263
APPARATUS FOR CONTROLLING
PHYSICAL QUANTITIES
Olof Werner Ohlsson, Jonkoping, Sweden, assignor to Industrilaboratoriet Aktiebolag, Jonkoping, Sweden
Filed Feb. 14, 1966, Ser. No. 527,252
Claims priority, application Sweden, Feb. 23, 1965,
2,304/65
U.S. Cl. 137—392      9 Claims
Int. Cl. F17d 3/00

ABSTRACT OF THE DISCLOSURE

Apparatus for controlling physical quantities including a phase-sensitive detector, the output of which governs a control means for controlling the controlled quantity and the reference signal of which detector is applied to the movable contact of a feedback potentiometer having its movable contact connected to the control means. The movable contact is also interconnected between, and in series with, adjustable resistors, the two opposite ends of which are connected to opposite points of the detector.

---

This invention relates to improvements in controls or the like having a phase-sensitive detector, the output of which governs a control means for controlling the controlled quantity and the reference signal of which is applied to the movable contact of a feed-back potentiometer having its movable contact connected to the control means and which is interconnected between and in series with two adjustable resistors the other terminals of which are connected to two opposite points of the detector, the potentials of which are substantially equal but of opposite polarity. Such controls may be utilized for controlling substantially any electrical or other quantity, e.g. for proportional adjustment of the liquid level in a tank through which liquid flows or for maintaining such a level constant.

To obtain such an electro-proportional adjustment of the level in a pressure vacuum tank containing flowing liquid it has been proposed in the prior art to utilize a control according to FIG. 1. In this control those components or members which comprise same are evident from the block diagram, viz. a tank 1, a transmitter 2 arranged in or at the tank, a detector 3, an amplifier 4, an electro-pneumatic transducer 5, a pressure reducing valve 6, a filter 7, conduits 8a–8e for pressurized fluid, a valve 9 and a liquid supply duct 10 which leads to the tank 1 and to which the valve 9 is interconnected. The detector 3 is adapted to set the nominal value, i.e. the desired liquid level in the tank. The pressure in the conduits 8a, 8c may be e.g. 85.32 p.s.i., which is reduced to 17.06 p.s.i. to 19.9 p.s.i. in the reducing valve 6. The electro-pneumatic transducer 5 adjusts the pressure in the conduit 8e in dependence on the signal of the transmitter 2, and the valve 9 is set in dependence on the pressure in the conduit 8e.

Another way is to make (the proportional) signal from the transmitter 2 govern a recording instrument which in its turn through an internal device gives an output of the order of e.g. 1–5 ma. This proportional signal in its turn feeds the electro-pneumatic transducer 5 which in its turn controls the valve 9 in the duct 10 to the tank.

A control apparatus suitable for air conditioning and similar systems is also known which comprises two circuits connected each with a supply of alternating current. Each of said circuits includes a rectifier and a resistance, and the circuits are normally balanced and in phase opposition. The apparatus is further provided with means for introducing into the rectifying stages of said circuits a separate alternating control signal of the same frequency as and respectively in phase with and phase opposition to the aforesaid alternating currents, so that changes in value and/or reversals in phase of said control signal unbalance said circuits. This control apparatus also includes a galvanometer-type relay which is arranged to be operated when said circuits are unbalanced, and a reversible motor controlled by said relay to operate a controlling device, such as a valve admitting steam to an air conditioning system.

Common to all electronic, proportional controls of the kind described above is the feature that the proportional signal from the transmitter is greatly amplified, either in a recording instrument or in individual amplifiers, to be subsequently transformed into a proportional, preferably pneumatic force which acts upon a proportional (sometimes logarithmic) valve or the like. Particularly the last-mentioned system is high-ohmic and on account hereof sensitive to noise signals which may be absorbed by the resistances from adjacent motors and apparatus.

The principal object of the present invention is to provide an arrangement of the kind described above, in which the nominal value may easily be altered or adjusted from time to time, either by hand or automatically, e.g. under the influence of a second quantity or variable which may be a function of the first quantity.

This object is attained by the arrangement according to the invention which also eliminates the drawback of the apparatus of the prior art described above and in which the two outer, adjustable series resistors are ganged in such a way that a change of the effective resistance of one of said further series resistors results in a corresponding change with the opposite sign of the effective resistance of the other adjustable series resistor.

Although the arrangement according to the invention is particularly suited for and below described in connection with the control of a level, its application is by no means restricted thereto; it has general applicability.

Other features and advantages of the arrangement in accordance with the invention will become apparent from the following description and the annexed drawings which diagrammatically and as non-limiting example disclose some preferred embodiments of the invention.

FIG. 1 is, as has become apparent from the above, a block diagram of a level control of the prior art.

FIG. 2 is a diagram of a first embodiment of the invention, the detector being a modified half-wave detector of the Walter-type.

FIG. 5 illustrates a further development of the invention.

Figure 3:
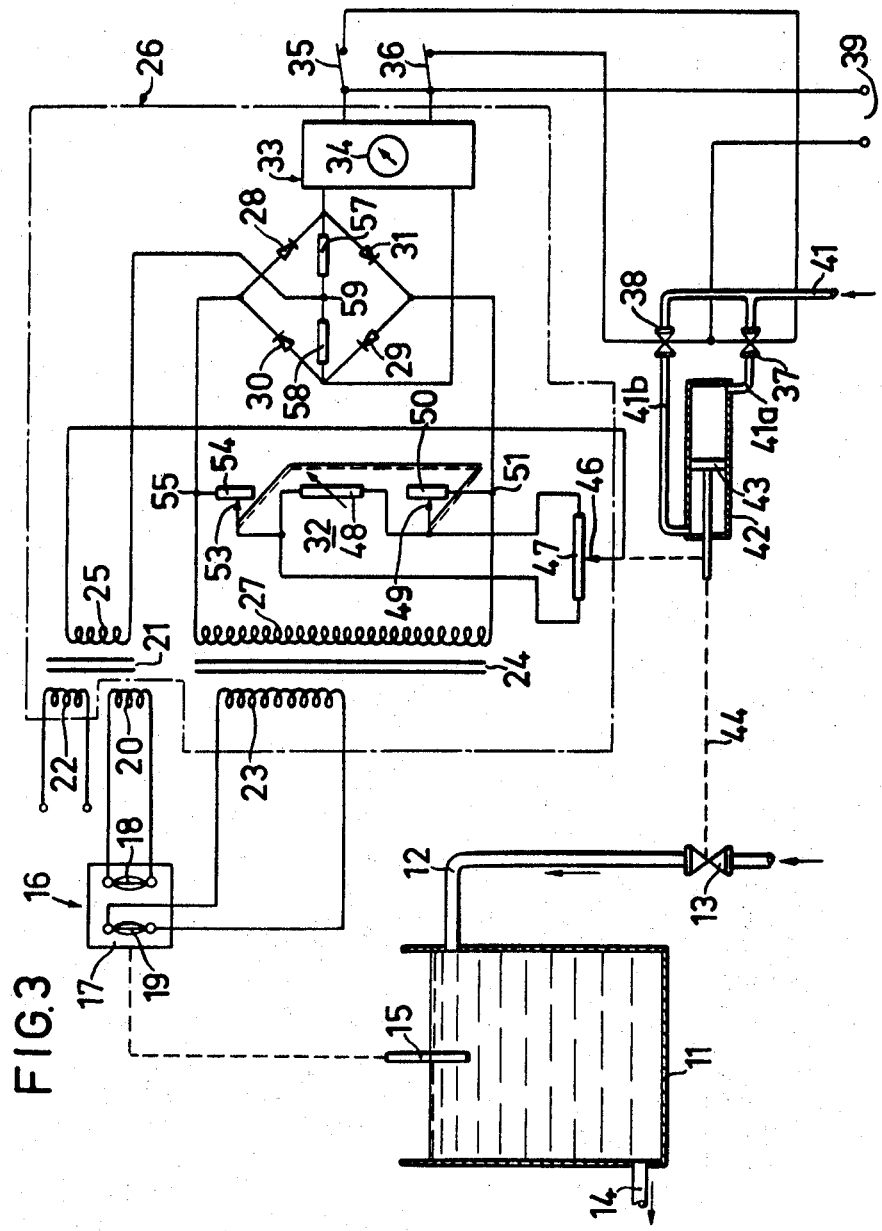
FIG. 3 is a diagram illustrating a second embodiment in which the detector is a modified full-wave detector of the Walter-type.

In FIGS. 2–5 the same reference characters are used to denote the same or like members. Although the invention of course is not restricted thereto, the transmitter is supposed to be a magneto-strictive transmitter and the phase-sensitive detector to be of the Walter-type. Such detectors are disclosed e.g. in Electronics, February 1954, page 188.

In the system according to FIG. 2, 11 designates a liquid tank or a container in which the liquid level should be maintained constant or controlled by means of the arrangement according to the invention. Element 12 is a supply duct through which liquid is supplied to the tank 11 and in which a valve 13 is interconnected, the setting of which is adjusted by means of the control according to the invention. From the tank liquid flows out through the outlet 14. In the liquid a probe 15 is partly immersed and displaces a liquid quantity or displacement of the volume of which is dependent on the location of the liquid level. The probe 15 is mechanically connected to a transmitter 16 in such a way, that mechanical load upon and accordingly the output signal from the transmitter varies in dependence of the depth of the liquid in the tank 11.

It is here only necessary to state that the transmitter comprises a measuring body 17 of ferro-magnetic material, an energizing winding 18, and a measuring winding 19 each of which are wound through an individual pair of openings in the measuring body. The energizing winding 18 is coupled to a first secondary winding 20 in a transformer 21 the primary winding 22 of which is fed from the mains, e.g. with 220 v., 50 c./s. The measuring winding 19 is coupled to and feeds a primary winding 23 in a second trnasformer 24. When the energizing winding 18 is fed with alternating voltage from the secondary winding 20 there is induced over the measuring winding 19 a voltage which is approximately proportional to the mechanical load upon the transmitter and accordingly proportional to the discrepancy from the nominal value of the liquid level in the tank.

The primary 22 of the transformer 21 feeds a secondary winding 25 which is, like the primary, part of a phase-sensitive half-wave detector which is generally designated 26 and is in principle of the Walter-type but which has been modified in accordance with this invention. In the detector 26 there is also included the transformed 24 the secondary of which is designated 27, two diodes 28, 29, a resistive network 32 which will be subsequently described, and a relay and galvanometer branch which is generally designated 33, the detailed nature of which is not essential to the invention. In the galvanometer branch there is also a galvanometer 34 and two relays (not shown) each of which governs a contact 35 and 36, respectively. The reference voltage of the detector is generated over the secondary 25 in the usual way, whereas the signal or control voltage from the measuring winding 19 of the transmitter is induced over the secondary 27 of the transformer 24. The center 40 of the secondary 27 is connected to one end of the secondary 25. The contacts 35, 36 which are controlled by their respective relays in dependence of the polarity or direction of the current through the galvanometer 34 are each connected in series with an electro-magnetic valve 37 and 38, respectively which electrically are connected in parallel to a voltage source 39. The valves 37, 38 are each interconnected in a pressurized fluid conduit 41a and 41b, respectively which are connected to a pressurized fluid source, e.g. an air compressor (not shown) by means of a common conduit 41. The conduits 41a and 41b open into opposite ends of a pneumatic cylinder 42. In the cylinder 42 a piston 43 is movable in response to the pressure on opposite sides of the piston 43. When the two contacts 35, 36 are closed (or alternatively open in dependence of the nature of the magnetic valves 37, 38) the magnetic valves are open and the piston 43 is in a suitable intermediate position. By means of a mechanical connection on which is indicated by a dotted line 44 the piston 43 in its turn adjusts the valve 13 in the feed conduit 12 to the tank 11 at its movements.

The arrangement is provided with an electric feed-back in that the piston 43 is mechanically or in another way interconnected with the movable contact 46 of a feed-back potentiometer 47 which is located in the resistive network 32. A resistor 48 with adjustable resistance is connected in parallel with the potentiometer 47. One end of the potentiometer 47 is connected to the movable contact 49 of a second potentiometer 50 which like the resistor 48 also is located in the resistive network 32. One end of potentiometer 50 is directly connected with the diode 29 as well as with one end 51 of the galvanometer and relay branch 33. In the corresponding way the other end of the potentiometer 47 is connected to the movable contact 53 of a third potentiometer 54 which is also located in the resistive network 32 and one end of which is directly connected with the diode 28 as well as with the other end 55 of the galvanometer and relay branch 33. Accordingly, the points 51 and 55 constitute two opposing points in the phase-sensitive detector 26.

From the above it will be apparent that when the liquid level in the tank 11 is at a certain, set, nominal value, a predetermined signal voltage (which may be zero) is transferred by the transformer 24 from the measure winding 19 to the two halves of the secondary 27, the two voltage components induced over the respective half of the secondary being balanced, however, through suitable setting of the movable contact 46 and/or the movable contacts 49, 53, so that no current flows through the galvanometer and relay branch 33. Consequently, the magnetic valves 37, 38 are open and the pressure in the cylinder 52 is equal to both sides of the piston 43 which thus remains still in some intermediate position which corresponds to partly open valve 13.

If now the liquid level in the tank should change, this would give rise to an increase or decrease in the mechanical load upon the transmitter 16 as well as in the signal voltage which from the measuring winding 19 is applied to the phase-sensitive detector 26. The consequence hereof is that one of the relays in the branch 33 becomes energized and transfers its contact 35, 36 which in turn closes its magnetic valve 37 or 38, respectively, so that the pressure on a corresponding side of the piston 43 decreases, and the latter will then be displaced in such a direction, that it adjusts the valve 13 in such a manner that the change in the location of the liquid level in the tank 11 becomes compensated. Because of the movement of the piston 43, the movable contact 46 of the feed-back potentiometer 47 is displaced in a direction which tends to nullify the current through the galvanometer and relay branch 33.

From the above it will be apparent that it is possible to change the nominal value of the level in the tank 11 by varying the position of the movable contact 46. From FIG. 2 it is, however, also clear that a displacement of the movable contact 46 e.g. towards the right is equivalent to a concurrent displacement of the two movable contacts 49, 53 downwards. If the last-mentioned movable contacts are ganged according to the invention as shown in FIGS. 2-5, the nominal value of the liquid level in the tank 11 may be set or altered by a selective interconnection of a desired, effective resistance of the resistors 50, 54.

One and the same displacement of the movable contact 46 will apparently have a greater influence on the current through the relay and galvanometer branch 33 the higher the effective resistance of the resistor 48 is. In accordance with the invention the feed-back sensitivity may consequently be increased by increasing the resistance connected in parallel with the feed-back potentiometer 47, and in addition thereto any influence of the feed-back may be completely eliminated by making the resistance of the resistor 48 (and/or 47) equal to zero. This last-mentioned possibility means that the arrangement operates as an on-off-regulator.

The arrangement described above may be modified in several ways within the scope of the invention. For instance, the resistive network 32 with in FIG. 2 is shown to be located behind the diodes 28, 29 with respect to the signal voltage secondary 27, may also be interconnected over the winding, between the same and the diodes 28, 29. In this instance, a potentiometer or the like has to be interconnected at the location of the resistive network 32 in FIG. 2, and in addition thereto the lower end of the secondary 25 of the reference voltage has to be connected to the movable contact of the first-mentioned potentiometer instead of to the center of the winding 27 as is now illustrated in FIG. 2.

The arrangement just described but having a full-wave detector instead of a half-wave detector is illustrated in the diagram of FIG. 3 which with respect to FIG. 2 has thus been supplemented with the diodes 30 and 31 and the resistors 57 and 58, the junction 59 of which is connected to the lower end of the secondary 25. The rest of FIG. 3 corresponds to FIG. 2, and the same reference characters have therefore been utilized to designate the corresponding members. The advantage of the full-wave detector according to FIG. 3 primarily resides in the fact that the power supplied to the galvanometer 34 and consequently the sensitivity increases at a given signal voltage from the measuring winding 19.

Figure 4:
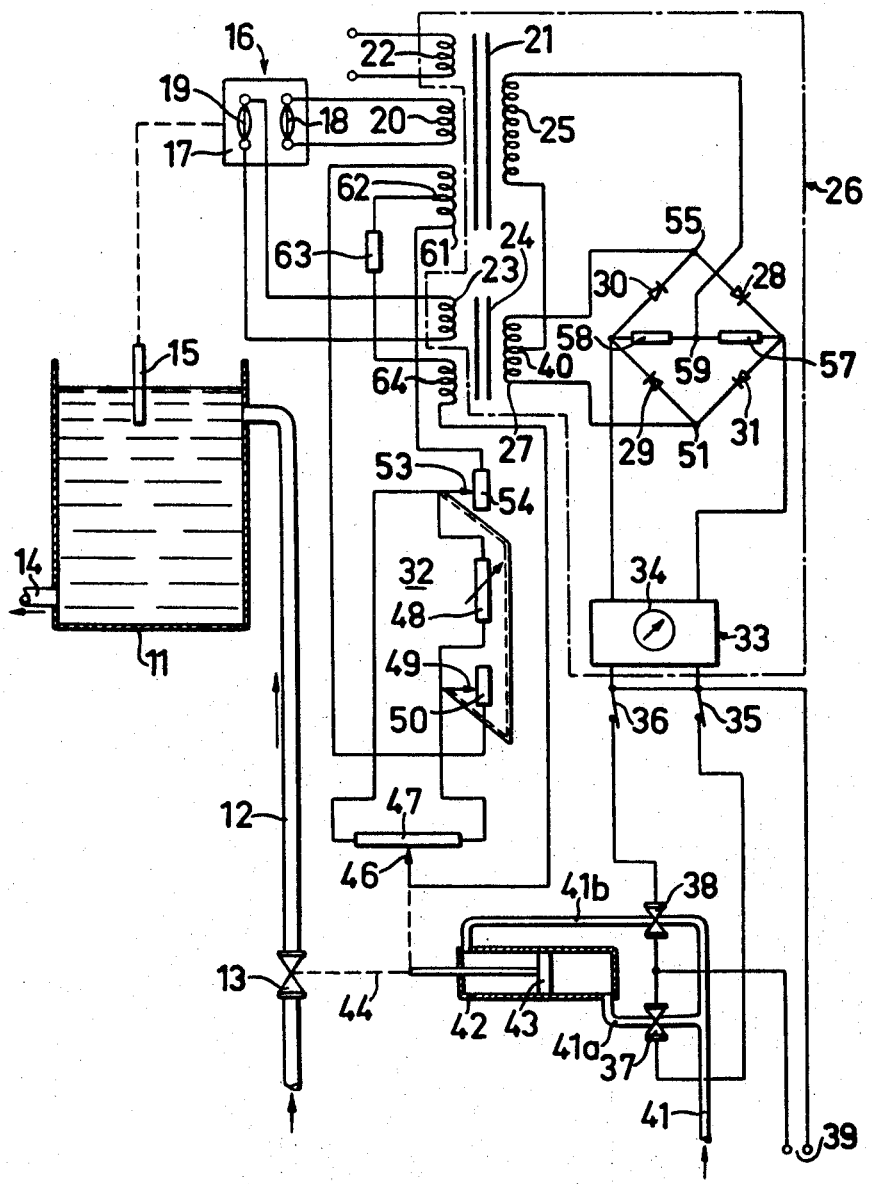
FIG. 4 is a diagram illustrating a third embodiment of the invention in which the detector is a full-wave detector and the circuitry, in which the feed-back potentiometer is comprised, is coupled to the two abovementioned opposite points in the detector, which is of the Walter-type, by means of a transformer.

In FIG. 4 the modification with respect to FIG. 3 has been made, that the resistance network 32 is inductively coupled to the points 51, 55 of the detector by means of a transformer instead of being metallicly coupled thereto. The reference voltage to the resistive network 32 is obtained from a third secondary 61 which is located in the transformer 21 and is provided with a center tap 62 which is through a resistor 63 connected to the upper end of a primary 64 which is located in the transformer 24 and the lower end of which is directly connected to the movable contact of the feed-back potentiometer 47. The signal voltage over the portion of the feed-back potentiometer 47 which is located between the movable contact 46 and either of the ends of the potentiometer and the effective portion of the resistor 50 or 54, respectively which is connected in series with its respective portion of the potentiometer, is coupled from the primary 64 together with the signal voltage over the primary 23 to the secondary 27 of the transformer 24, that is to the diametrically opposing points 51, 55. The advantages of the inductive interconnection of the resistive network 32 according to FIG. 4 resides primarily in, that it has hereby become possible to make the resistance of the resistive network much lower and reduce the value as well as the importance of noise signals which may be absorbed by the resistive network 32 from adjacent motors and apparatus.

As non-limiting examples suitable values of the resistance of the resistors and potentiometers illustrated in FIG. 4 are listed below:

Potentiometer: Ohms
47 ------------------------------------- 135
50 ------------------------------------- 100
54 ------------------------------------- 100
Resistor:
48 ------------------------------------- 1000
63 ------------------------------------- 330

In FIGS. 2–4 it has been assumed that the ganged, adjustable resistors 50, 54 for setting the nominal value of the controlled quantity are adjusted or set by hand. According to a further development of the invention these resistors may also be set automatically. e.g. under the influence of a second quantity or variable which is usually a function of the first quantity. An example hereof is illustrated in FIG. 5 which shows the resistive networks 32 of two cascaded arrangements I, II which are in principle designed according to FIG. 2 or 3, although only their resistive networks 32 have been disclosed. The arrangement II is in complete agreement with that illustrated in FIG. 2 or 3, whereas the arrangement I has been modified by interconnecting two further, ganged resistors 66, 67 having movable contacts 68 and 69, respectively, in series with the resistors 54 and 50, respectively, in the manner illustrated. In the example it has been assumed that the arrangement I of FIG. 5 controls the level in a tank 11 in the manner described above and that the cascaded arrangement II controls a subsequent stage in a process in which the liquid flowing out of the tank 11 is utilized. If now the arrangement II for one reason or another should indicate that the correct liquid quantity in said subsequent stage is other than the real one, which brings about a resetting of the movable contact 46 in this arrangement II, the movement of the movable contact 46 may be utilized to readjust the movable contacts 68 and 69, respectively, of the ganged, adjustable resistors 66, 67 and to thereby correct the nominal value of the first quantity. The connection 44 from the movable contact 46 in the arrangement II thus leads to the movable contacts 68, 69 in the arrangement I instead of to the valve 13, as in the arrangement I.

The cascaded arrangement according to FIG. 5 may be extended to encompass any number of stages (1, 2, 3 . . . n). Also, it is not necessary that stage n controls the immediately preceding stage (n−1), but it may as well control another previous stage, e.g. (n−3). Furthermore, several subsequent stages may control either one and the same previous stage or several different previous stages. An advantage with the cascaded arrangement in accordance with the invention resides in the fact, that it is possible automatically to adjust the nominal value of all previous stages via their ganged resistors 66, 67 and/or transmitter 16, by adjusting the nominal value of the last stage.

The cascaded arrangement described above may to advantage be utilized, e.g. to control the thickness of the board in a wall-board-factory, the thickness of the sheet iron in a rolling mill or the paper thickness in a paper making machine.

The embodiments described above and illustrated in the drawings are, of course, to be regarded merely as non-limiting examples and may as to their details be modified in several ways within the scope of the following claims. Thus, it is possible to apply the principle of FIG. 5 to the arrangement according to FIG. 4 as well as to the arrangement according to FIG. 2 or 3. Furthermore, the resistors 54, 66 on the one hand and 50, 67 on the other hand may each be connected in series with one or more adjustable, pairwise ganged resistors, which are pairwise controlled in the same way as the pair of resistors 66, 67. The sequencial order of these resistors is not limited to the principle illustrated in FIG. 5. In addition thereto, the detector 26 does not have to be of the Walter type, but any suitable detector could be utilized. Finally, new embodiments, which also are within the scope of the invention may be created by combining features of the embodiments described above.

What I claim is:
1. Arrangement in controls for a physical quantity, comprising
   a phase sensitive detector,
   a control means operatively associated with and governed by the output of said phase sensitive detector for controlling the controlled quantity,
   a feed-back potentiometer having a movable contact which is connected to said control means and to which the reference signal of said phase sensitive detector is applied,
   two further adjustable resistors which are connected in series with said feed-back potentiometer and are located, in electrical respect, on mutually opposite sides thereof and have their outer ends connected to two points of said phase sensitive detector the potentials of which are substantially equal but of opposite polarity, said further adjustable series resistors being ganged in such a way that a change of the effective resistance of one of said further series resistors results in a corresponding change with the opposite sign of the effective resistance of the other adjustable series resistor.

2. Arrangement according to claim 1, wherein the feed-back potentiometer is connected in parallel with an adjustable resistor.

3. Arrangement in controls for a physical quantity, comprising
   a phase sensitive detector, a control means operatively associated with and governed by the output of said phase sensitive detector for controlling the controlled quantity, a first transformer having a secondary winding over which the reference signal of said phase sensitive detector is induced and at least one further secondary winding;

a second transformer having a secondary winding over which the control signal of said phase sensitive detector is induced and at least one primary winding;

a resistive network which comprises a feed-back potentiometer having a movable contact which is connected to said control means and is electrically connected to said one primary winding of said second transformer, and two further adjustable resistors which are connected in series with said feed-back potentiometer and are located, in electrical respect, on mutually opposite sides thereof and have their outer ends connected to opposite ends of said one further secondary winding of said first transformer, said further adjustable series resistors being ganged in such a way that a change of the effective resistance of one of said further series resistors results in a corresponding change with the opposite sign of the effective resistance of the other adjustable series resistor.

4. Control comprising a plurality of cascaded arrangements according to claim 1 and each controlling one stage of a process.

5. Control according to claim 4 for processes comprising a plurality of steps, wherein at least one arrangement allotted to a subsequent stage of the process is adapted to control at least one preceding stage of the process.

6. Control according to claim 5, wherein at least one of said preceding stages comprises a resistive network having a further pair of adjustable, ganged resistors which are each connected in series with one of the two first-mentioned adjustable series resistors, and wherein the movable contact of each of the feed-back potentiometers of the subsequent stages is compulsorily connected to said further pair of adjustable resistors in at least one preceding stage in such a way that said movable contact adjusts the effective resistance of said further resistors in dependence of its position.

7. Control comprising a plurality of cascaded arrangements according to claim 3 and each controlling one stage of a process.

8. Control according to claim 7 for processes comprising a plurality of steps, wherein at least one arrangement allotted to a subsequent stage of the process is adapted to control at least one preceding stage of the process.

9. Control according to claim 8, wherein at least one of said preceding stages comprises a resistive network having a further pair of adjustable, ganged resistors which are each connected in series with one of the two first-mentioned adjustable series resistors, and wherein the movable contact of each of the feed-back potentiometers of the subsequent stages is compulsorily connected to said further pair of adjustable resistors in at least one preceding stage in such a way that said movable contact adjusts the effective resistance of said further resistors in dependence of its position.

References Cited

UNITED STATES PATENTS

| | | | |
|---|---|---|---|
| 2,608,678 | 8/1952 | Marchment et al. | 318—456 |
| 2,763,283 | 9/1956 | Griffith et al. | 137—392 |
| 2,888,945 | 6/1959 | Marlow | 137—392 |
| 3,042,908 | 7/1962 | Pearson | 317—123.4 |

WILLIAM F. O'DEA, *Primary Examiner.*

DAVID R. MATTHEWS, *Assistant Examiner.*

U.S. Cl. X.R.

317—123